(12) United States Patent
Paterson, Jr. et al.

(10) Patent No.: US 11,740,631 B2
(45) Date of Patent: Aug. 29, 2023

(54) SYSTEMS AND METHODS FOR AN ARBITRATION CONTROLLER TO ARBITRATE MULTIPLE AUTOMATION REQUESTS ON A MATERIAL HANDLING VEHICLE

(71) Applicant: The Raymond Corporation, Greene, NY (US)

(72) Inventors: Robert J. Paterson, Jr., Binghamton, NY (US); Christopher M. Mayes, Vestal, NY (US)

(73) Assignee: The Raymond Corporation, Greene, NY (US)

( * ) Notice: Subject to any disclaimer, the term of this patent is extended or adjusted under 35 U.S.C. 154(b) by 181 days.

(21) Appl. No.: 16/837,585

(22) Filed: Apr. 1, 2020

(65) Prior Publication Data

US 2020/0319643 A1 Oct. 8, 2020

Related U.S. Application Data

(60) Provisional application No. 62/828,107, filed on Apr. 2, 2019.

(51) Int. Cl.
*G05D 1/02* (2020.01)
*B60R 16/023* (2006.01)
(Continued)

(52) U.S. Cl.
CPC ........... *G05D 1/021* (2013.01); *B60R 16/023* (2013.01); *G06F 13/1605* (2013.01);
(Continued)

(58) Field of Classification Search
USPC ........................................................ 710/110
See application file for complete search history.

(56) References Cited

U.S. PATENT DOCUMENTS

| 4,766,547 A | * | 8/1988 | Modery | ................. B61L 27/04 |
|||||700/229|
| 5,148,112 A | * | 9/1992 | Gahan | ..................... H03K 5/22 |
|||||327/19|

(Continued)

FOREIGN PATENT DOCUMENTS

EP 1862357 A1 12/2007

OTHER PUBLICATIONS

Mikipedia definition of multidrop bus Feb. 7, 2012 (Year: 2012).*

(Continued)

*Primary Examiner* — Paul R. Myers
(74) *Attorney, Agent, or Firm* — Quarles & Brady LLP

(57) ABSTRACT

An automation arbitration controller system is provided. The automation arbitration controller is configured to arbitrate a multiple of automation requests on a material handling vehicle, which includes a material handling vehicle controller. The automation arbitration controller can be connected to at least one automation controller via an automation communication bus. The automation controller can be configured to send one or more automation requests. The automation arbitration controller can also be connected to a material handling vehicle controller via a vehicle communication bus. The material handling vehicle controller can be configured to send one or more automation requests.

20 Claims, 3 Drawing Sheets

(51) Int. Cl.
*H04L 12/40* (2006.01)
*G06F 13/16* (2006.01)
*H04L 12/403* (2006.01)
*G06V 20/58* (2022.01)

(52) U.S. Cl.
CPC ............ *G06V 20/58* (2022.01); *H04L 12/403* (2013.01); *H04L 12/40013* (2013.01); *H04L 12/40143* (2013.01); *G05D 2201/0216* (2013.01)

(56) References Cited

U.S. PATENT DOCUMENTS

| | | | | |
|---|---|---|---|---|
| 5,483,230 | A * | 1/1996 | Mueller | H04L 12/4135 340/3.1 |
| 5,621,291 | A * | 4/1997 | Lee | G05D 1/0272 318/587 |
| 5,664,121 | A * | 9/1997 | Cerauskis | G06F 13/362 710/118 |
| 5,805,837 | A * | 9/1998 | Hoover | G06F 13/362 710/110 |
| 6,370,593 | B1 * | 4/2002 | Larson | G06F 13/4031 710/1 |
| 8,249,910 | B2 | 8/2012 | Wellman | |
| 8,818,609 | B1 * | 8/2014 | Boyko | B60W 30/00 701/28 |
| 10,078,338 | B2 | 9/2018 | Smartt | |
| 10,294,028 | B2 | 5/2019 | Hamilton | |
| 10,775,783 | B2 * | 9/2020 | Lawler | G05D 1/0027 |
| 2003/0140179 | A1 * | 7/2003 | Wilt | G06F 9/4843 719/321 |
| 2005/0064993 | A1 * | 3/2005 | Ginther | B60K 23/04 477/166 |
| 2008/0005258 | A1 * | 1/2008 | Sridharan | H04L 49/9063 709/212 |
| 2009/0118958 | A1 * | 5/2009 | Abe | B60W 30/16 701/70 |
| 2011/0190933 | A1 * | 8/2011 | Shein | B62D 55/075 901/1 |
| 2011/0276735 | A1 * | 11/2011 | Cho | G06F 13/368 710/110 |
| 2012/0185091 | A1 * | 7/2012 | Field | G05D 1/0088 700/262 |
| 2012/0209512 | A1 * | 8/2012 | Kujirai | G01C 21/3423 701/428 |
| 2013/0231779 | A1 * | 9/2013 | Purkayastha | B25J 9/1697 700/258 |
| 2013/0236279 | A1 * | 9/2013 | Franzen | B65G 63/004 180/167 |
| 2013/0338886 | A1 * | 12/2013 | Callea | G06F 17/00 701/50 |
| 2014/0297117 | A1 * | 10/2014 | Near | B60G 13/14 701/37 |
| 2016/0191420 | A1 * | 6/2016 | Nagarajan | H04L 49/25 370/389 |
| 2018/0050692 | A1 | 2/2018 | Kim | |
| 2018/0196443 | A1 * | 7/2018 | Bai | H04W 4/023 |
| 2019/0113927 | A1 * | 4/2019 | England | G05D 1/0231 |
| 2019/0258251 | A1 | 8/2019 | Ditty | |
| 2019/0278243 | A1 * | 9/2019 | Hanafusa | G05B 19/042 |
| 2019/0283909 | A1 * | 9/2019 | Amemura | B65B 57/00 |
| 2019/0361454 | A1 | 11/2019 | Zeng | |
| 2019/0382045 | A1 | 12/2019 | Sachs | |
| 2021/0385573 | A1 * | 12/2021 | Popa | H04R 1/406 |

OTHER PUBLICATIONS

Structured Computer Organization second edition by Andrew S. Tanenbaum (Year: 1984).*
European Patent Office. Extended European Search Report for application 20167607-9, dated Aug. 12, 2020.
Rosenblatt, J. K. et al. "Combining multiple goals in a behavior-based architecture." Proceedings 1995 IEEE/RSJ International Conference on Intelligent Robots and Systems. Human Robot Interaction and Cooperative Robots. vol. 1. IEEE, 1995.

* cited by examiner

SYSTEMS AND METHODS FOR AN ARBITRATION CONTROLLER TO ARBITRATE MULTIPLE AUTOMATION REQUESTS ON A MATERIAL HANDLING VEHICLE

CROSS-REFERENCES TO RELATED APPLICATIONS

The present application is based on and claims priority to U.S. Provisional Patent Application No. 62/828,107, filed on Apr. 2, 2019, and entitled "Systems and Methods for an Arbitration Controller to Handle Multiple Automation Requests on a Material Handling Vehicle," which is hereby incorporated by reference herein in its entirety for all purposes.

STATEMENT REGARDING FEDERALLY SPONSORED RESEARCH

Not Applicable.

BACKGROUND

The present disclosure relates generally to material handling vehicles and, more specifically, to a controller that can be separate from a native material handling vehicle controller to handle multiple requests on a material handling vehicle that originate from one or more controllers.

Material handling vehicles that are autonomous or semi-autonomous are including an increasing amount of automation controllers. Each of these automation controllers may attempt to limit or control the operation of the material handling vehicle based on the inputs received by the respective automation controllers. Thus, there is a substantial amount of data being generated, all of which may result in attempts to limit or control operation of the material handling vehicle when operating in an autonomous or semi-autonomous mode.

BRIEF SUMMARY

The present disclosure provides an automation arbitration controller. The automation arbitration controller can be separate from the native material handling vehicle controller and is configured to arbitrate multiple automation requests on a material handling vehicle that originate from one or more automation controllers.

In one aspect, the present disclosure provides an automation arbitration controller system that may arbitrate automation requests by considering one or more vehicle parameters. Vehicle parameters may include vehicle position, vehicle mode (manual, semi-autonomous, or autonomous), vehicle status, and/or an object detection status. The automation arbitration controller may then set vehicle operational control limits for vehicle operation based on the individual automation requests. Vehicle operational control limits may include vehicle speed, lift height, steering rate, etc.

In another aspect, the present disclosure provides an automation arbitration controller that may allow a single automation controller to govern the control limits for vehicle operation. Further, the automation arbitration controller may allow multiple automation controllers to govern the vehicle operational control limits, wherein the automation arbitration controller selectively applies the most conservative vehicle operational control limits for vehicle operation.

In another aspect, the present disclosure provides a material handling vehicle including an automation arbitration controller system, the automation arbitration controller system comprising an automation communication bus that connects an automation arbitration controller on the material handling vehicle to at least one automation controller on the material handling vehicle; the automation arbitration controller configured to arbitrate at least one automation request from the at least one automation controller to determine vehicle control information, the at least one automation controller configured to communicate the at least one automation request on the automation communication bus; a material handling vehicle controller on the material handling vehicle; and a vehicle communication bus that connects the automation arbitration controller to the material handling vehicle controller, the automation arbitration controller configured to communicate the determined vehicle control information to the material handling vehicle controller on the vehicle communication bus.

In some embodiments, the automation arbitration controller is configured to arbitrate a plurality of automation requests from a plurality of automation controllers, the plurality of automation requests to request control of vehicle limits on the operation of the material handling vehicle, and the automation arbitration controller is configured to arbitrate the plurality of automation requests to determine the most restrictive of the vehicle control limits and to then communicate the determined vehicle control information to the material handling vehicle controller.

In some embodiments the automation arbitration controller is configured to arbitrate a plurality of concurrent automation requests from a plurality of automation controllers, the plurality of concurrent automation requests to request control of the material handling vehicle, and the automation arbitration controller is configured to arbitrate the plurality of concurrent automations requests to determine which automation controller will have priority and will be granted control of the material handling vehicle, and to then communicate to the material handling vehicle controller which automation controller will have priority and will be granted control of the material handling vehicle.

In some embodiments, the automation arbitration controller is configured to arbitrate the plurality of concurrent automation requests on at least one of a first come first serve basis or a round robin basis.

In some embodiments, the at least one automation controller is configured to operate in an operational mode that is set by each automation controller during initialization, and the automation arbitration controller is configured to enable or disable messages to and from the at least one automation controller based on the operational mode.

In some embodiments, the operational mode comprises a limiting mode only, and a limiting mode and control mode.

In some embodiments, the automation arbitration controller is configured to operate in a request control mode, where the automation arbitration controller is configured to enable one of the at least one automation controllers to apply its vehicle operational control limits to the material handling vehicle; and the automation arbitration controller is configured to operate in a request limit mode, where the automation arbitration controller is configured to arbitrate and prioritize a plurality of requested control limits from the at least one automation controllers to provide control of the material handling vehicle.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Figure 1:
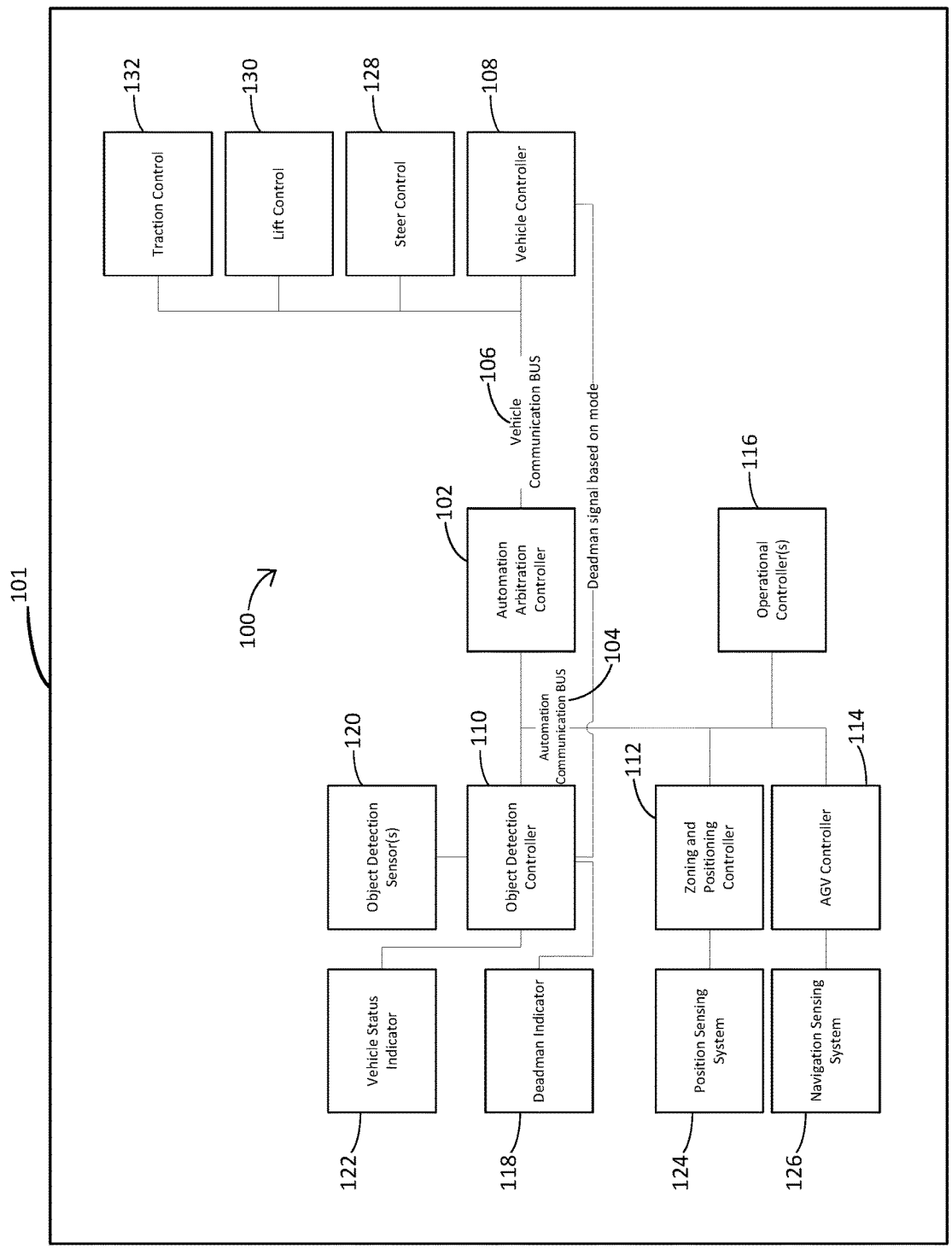
FIG. 1 is a schematic illustration of an automation arbitration controller in communication with automation controllers according to aspects of the present disclosure.

Before any aspect of the present disclosure are explained in detail, it is to be understood that the present disclosure is not limited in its application to the details of construction and the arrangement of components set forth in the following description or illustrated in the following drawings. The present disclosure is capable of other configurations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use aspects of the present disclosure. Various modifications to the illustrated configurations will be readily apparent to those skilled in the art, and the generic principles herein can be applied to other configurations and applications without departing from aspects of the present disclosure. Thus, aspects of the present disclosure are not intended to be limited to configurations shown, but are to be accorded the widest scope consistent with the principles and features disclosed herein. The following detailed description is to be read with reference to the figures, in which like elements in different figures have like reference numerals. The figures, which are not necessarily to scale, depict selected configurations and are not intended to limit the scope of the present disclosure. Skilled artisans will recognize the non-limiting examples provided herein have many useful alternatives and fall within the scope of the present disclosure.

Generally, the present disclosure provides an automation arbitration controller, which in some embodiments can be separate from a material handling vehicle controller. The automation arbitration controller may not make functional decisions (e.g., whether or not to grant control or impose its own vehicle limits). Instead, the automation arbitration controller is configured to arbitrate multiple automation requests on a material handling vehicle that originate from one or more automation controllers. The automation arbitration controller allows for efficient handling of multiple automation controllers on the material handling vehicle and reduces the need for a native vehicle controller to determine control limits based on various autonomous control requests. The automation arbitration controller provides an application programming interface (API), which acts as a standard interface for automation controllers to adhere to. This minimizes development time on the vehicle side to support additional automation controller requirements. Generally, autonomous guided vehicles are separate from semi-autonomous and manual vehicles, however, the automation arbitration controller may allow the material handling vehicle to switch between manual, semi-autonomous, and autonomous modes and provide a more diverse and dynamic material handling vehicle.

FIG. 1 illustrates one non-limiting example of an automation arbitration controller system 100 according to the present disclosure. The automation arbitration controller system 100 can include an automation arbitration controller 102 connected between an automation communication bus 104 and a vehicle communication bus 106 on a material handling vehicle 101. Material handling vehicle controller communication designs typically utilize a Controller Area Network (CAN) bus architecture with a CANopen communication protocol. The automation arbitration controller 102 can be a node to one or more automation controllers and a master to a material handling vehicle controller 108. The material handling vehicle controller 108 reports a status via CANopen PDO (process data objects) to the automation arbitration controller 102. The automation arbitration controller can then broadcast the status to all of the automation controllers. The automation arbitration controller 102 can be a service data object server and a network management slave.

The automation arbitration controller 102 may be connected to the one or more automation controllers that can include, for example, an object detection controller 110, a zoning and positioning controller 112, an automated guided vehicle (AGV) controller 114, and one or more operational controllers 116. Each automation controller may be in communication with indicators, sensors, and sensing systems. For example, the object detection controller 110 may be in communication with a deadman indicator 118, one or more object detection sensors 120, and a vehicle status indicator 122.

The deadman indicator 118, in communication with the object detection controller 110, may provide an indication of a deadman switch on the material handling vehicle 101, which, for example, may be a switch that is activated when an operator is present within an operator compartment of the material handling vehicle, and deactivated when the operator is not present within the operator compartment. The one or more object detection sensors 120 may be configured to detect one or more objects in areas surrounding the material handling vehicle or in the path of the material handling vehicle. The one or more object detection sensors 120 may further provide an indication of the position of the material handling vehicle 101 relative to a detected object. The one or more object detection sensors 120 may be scanners, cameras, or any other sensing devices. The vehicle status indicator 122 may provide an indication of a battery charge level, a fork height, a fork position, how an envelope of the material handling vehicle changes as a load is engaged, a steer angle, and a speed of the material handling vehicle 101, as non-limiting examples.

The zoning and positioning controller 112 may be in communication with a position sensing system 124 that is configured to determine a position of the material handling vehicle 101 within an environment (e.g., a warehouse, a warehouse aisle). The position sensing system 124 may include a global positioning system (GPS), a camera-based navigation system, a wire guidance system, and/or a radio frequency identification (RFID) system, as non-limiting examples.

The AGV controller 114 may be in communication with a navigation sensing system 126 that may be configured to provide instructions to the AGV controller 114. For example, the AGV controller 114 may receive requests from a warehouse management system to pick up a load in one location and deliver the load to another location. This high level request may be broken down and executed by the navigation sensing system 126. The navigation sensing system 126 may choose the paths to travel for the most efficient route to arrive at a pickup location, and choose the correct navigation type for that area of the facility. The AGV controller 114 may then supply drive commands from the navigation sensing system 126 through the automation arbitration controller 102 to the material handling vehicle controller 108. Upon execution of the drive command by the material handling vehicle controller 108, the automation arbitration controller 102 may hand off control to the one or more operational controllers 116 or to an automation controller.

The one or more operational controllers 116 may govern operation during specific tasks performed by the material handling vehicle 101. For example, the one or more operational controllers 116 may include a load handling controller that controls operation of the material handling vehicle during load handling operations, which may include pick up and drop off operations.

The material handling vehicle controller 108 can control inputs from additional vehicle controllers including a steer control 128, a lift control 130, and a traction control 132. The steer control 128 is configured to adjust wheel direction relative to the material handling vehicle 101 to provide steering in response to operator inputs during manual mode, or navigation sensing system 126 inputs during semi-autonomous or autonomous mode. The lift control 130 is configured to raise and lower a set of forks on the material handling vehicle. The lift control 130 adjusts the forks in response to operator inputs during manual mode, or operational controller 116 inputs during semi-autonomous or autonomous mode. The traction control 132 may include traction sensors to measure a rotational wheel speed. The traction sensors may be connected to one or more controllers, including the object detection controller 110 and the material handling vehicle controller 108, to provide real time feedback as to the material handling vehicle's speed relative to a traction request or a speed limit request. The object detection controller 110, for example, may use the traction sensors to determine if the wheels that are receiving power may have lost traction or are not matching an expected speed. The traction control 132 may be configured to reduce wheel speed when the material handling vehicle 101 is operating in manual mode, semi-autonomous mode, or autonomous mode depending on, for example, environmental limits, direction of travel, load status, and fork height.

Figure 2:
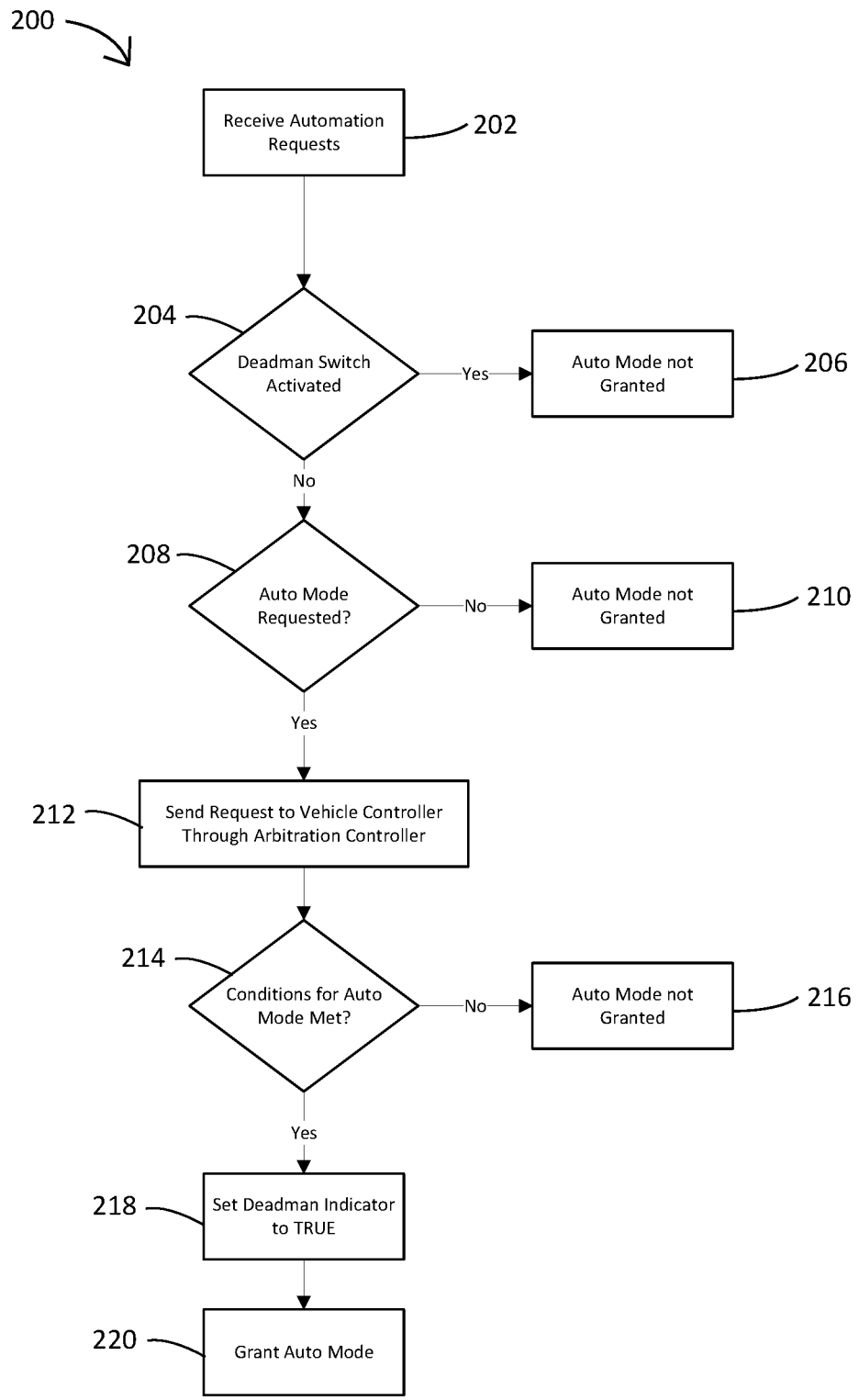
FIG. 2 is a flowchart outlining steps to grant a vehicle operational mode according to aspects of the present disclosure.

FIG. 2 illustrates an example of a sequence of steps 200 the automation arbitration controller 102 can undergo to determine the vehicle operational mode. The material handling vehicle 101 may be operable in a manual mode, semi-autonomous mode, or autonomous mode. When the material handling vehicle is keyed on, the material handing vehicle may be in manual mode. In one non-limiting example, the vehicle may enter a fully autonomous mode where operational commands are provided to the AGV controller 114 from the warehouse management system, or a semi-autonomous mode where the material handling vehicle remains a manned vehicle with limits placed on the vehicle based on its location within a facility.

In step 202, the automation arbitration controller 102 is configured to receive automation requests that can comprise control limits and control requests from the automation controllers, and to arbitrate the automation requests to determine what vehicle control information is to be sent to the material handling vehicle controller 108. In step 204, the material handling vehicle controller 108 can then evaluate a set of conditions (e.g., deadman indicator 118 and/or other vehicle control criteria), that are necessary for granting the autonomous mode and granting control to the AGV controller 114. Based on that evaluation of the set of conditions, the material handling vehicle controller 108 will grant or not grant control mode (i.e., control to the AGV controller 114). The material handling vehicle controller 108 can check if the deadman switch is activated (i.e., an operator is present). If, for example, the operator is standing in the operator compartment of the material handling vehicle 101, the material handling vehicle controller 108 does not grant autonomous mode 206. Alternatively, at step 204, the operator may step off a platform in the operator compartment and the automation arbitration controller 102 can receive an automation request comprising a control request that indicates the operator has requested autonomous mode at step 208. In one non-limiting example, the operator or a warehouse management system may request autonomous mode via a pushbutton, switch, display, or other wired or wireless activation mechanism. If the operator has not requested autonomous mode, then autonomous mode is not granted at step 210. If at step 208 the operator has requested autonomous mode, the AGV controller 114 may then send an automation request to the automation arbitration controller 102, which is forwarded to the material handling vehicle controller 108 at step 212. If conditions to enter autonomous mode are met at step 214, the deadman indicator 118 may be set to TRUE at step 218 and the material handling vehicle 101 may be allowed to enter autonomous mode at step 220. If conditions at step 214 are not met, autonomous mode may not be granted at step 216.

At any given point in time, the automation arbitration controller 102 may receive automation requests from multiple automation controllers for various limits to be placed on the operation of the material handling vehicle 101. The automation arbitration controller 102 is configured to arbitrate the automation requests to determine the most restrictive of the various vehicle control limits and communicate the determined automation request information (e.g., vehicle control limits) along to the material handling vehicle controller 108. For example, if two automation controllers are requesting the speed of the vehicle be limited to 6 MPH and 4 MPH respectively, then the automation arbitration controller can pass a 4 MPH limit to the material handling vehicle controller 108 for execution.

In addition, at any given point in time, the automation arbitration controller 102 may receive multiple concurrent automation requests from automation controllers to control the material handling vehicle 101. When multiple concurrent automation requests for vehicle control are received, the automation arbitration controller 102 can arbitrate the automations requests to determine which automation controller will have priority and can then communicate the control request to the material handling vehicle controller 108. This determination can be based on a first come first serve basis or round robin for simultaneous requests, as non-limiting examples. If the material handling vehicle controller 108 grants the requested control, then the appropriate automation controller is notified that control has been granted and its control information is in effect.

In manual mode, an operator may be required to operate the material handling vehicle 101. For example, the deadman indicator 118 may be passed through the object detection controller 110 to the material handling vehicle controller 108 when an operator is present in the operator compartment of the material handling vehicle. In manual mode, the control limits for vehicle operation, including speed, lift height, steering rate, etc., may be set by predetermined values stored in the material handling vehicle controller 108 of the material handling vehicle.

In one non-limiting embodiment, the deadman indicator 118 may be linked with activation of the object detection sensors 120. That is, upon activation of the deadman switch (i.e., the operator is present within the operator compartment), the object detection sensors 120 may be activated. In some instances, the object detection sensors may be used to further limit the material handling vehicle's functions in manual mode. For example, if an object is sensed on a floor in a current direction of travel, a top speed of the material handling vehicle 101 may be reduced or limited to a stop. Alternatively or additionally, if there are other sensing devices above the vehicle as the set of forks are lifted, the maximum lift height may be restricted based on proximity to the other sensing devices.

One or more of the automation controllers may send requests, or operational signals, that attempt to control or limit certain aspects of vehicle operation based on given inputs to the respective automation controller. In general, each automation controller repeatedly updates the control request information, preferably matching a current status of the material handling vehicle 101. The operational signals may be received by the automation arbitration controller 102 and the automation arbitration controller 102 can raise a control request flag. When the control has been granted by the material handling vehicle controller 108, a control granted response flag is raised by the automation arbitration controller 102. When the control granted response flag has been raised, the automation controller that control has been granted to can expect that its request is active. For example, based on a current position and location of a material handling vehicle 101 as detected by the zoning and positioning controller 112, the automation arbitration controller 102 may prioritize and enforce certain control limits for vehicle operation as required by the current location. When the material handling vehicle is in an area that is indicated as not requiring limited vehicle operational parameters, the automation arbitration controller 102 may receive control limits indicating to allow normal operation and reference the predetermined control limits stored in the material handling vehicle controller 108.

This request-grant sequence for multiple automation controllers may be accompanied by a unique identifier or unique key in addition to a NodeID for each automation controller that the automation arbitration controller 102 will match in response if that particular automation controller is granted control. This can provide an additional layer of regulation that only approved requests are granted and honored by the automation arbitration controller 102.

Each automation controller can be configured to operate in two types of operational modes. In the first type of operational mode, the automation controller can be configured for a limiting mode only. In the second type of operational mode, the automation controller can be configured for both a limiting mode and a control mode. If an automation controller is configured for the limiting mode only, then the automation arbitration controller 102 only considers the automation controller's requests to limit vehicle operational control limits (e.g., speed, lift height, etc.). If an automation controller is configured for both the limiting mode and the control mode, then the automation arbitration controller 102 considers both types of requests from that automation controller to limit vehicle operational control parameters and to request control of the material handling vehicle 101.

The specific operational mode (e.g., limiting mode only, or limiting mode and control mode) is set by each automation controller during its initialization, and the automation arbitration controller 102 can use this information to enable or disable various messages to and from the automation controllers. The operational mode is considered for each automation controller in communication with the automation arbitration controller 102. As described above, the automation arbitration controller 102 considers all vehicle operational control limits and the most restrictive limit is applied, such that all control requests are considered but only one automation controller is granted control at any point in time.

Figure 3:
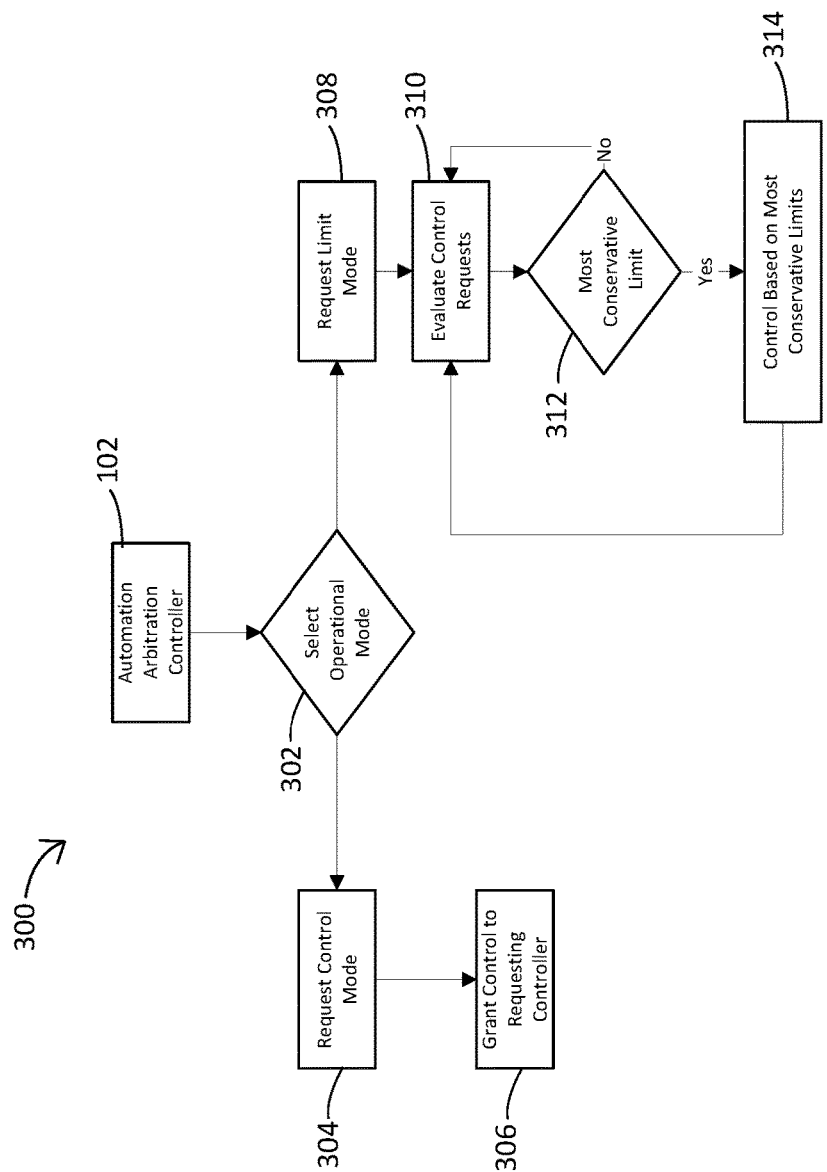
FIG. 3 is a flowchart outlining an automation arbitration controller process according to aspects of the present disclosure.

FIG. 3 illustrates an exemplary process 300 of the automation arbitration controller 102 based on the operational mode of the automation controllers. In this process 300, at 302, the arbitration automation controller 102 determines the operational mode of the automation controller. At 304, the request control mode identifies operation when a single automation controller is requesting control via the control mode. In the request control mode 304, only one automation controller may be allowed to control the material handling vehicle 101 at any point in time. At 308, the request limit mode identifies how vehicle operational control limits are evaluated via the limiting mode.

In this operation 300, when an automation controller is configured for limiting mode only, the automation controller will only operate in the request limit mode 308. When an automation controller is configured for both limiting mode and control mode, the automation controller can operate in both the request control mode 304 and the request limit mode 308.

With a plurality of automation controllers attempting to limit (via the limiting mode) or control (via the control mode) the operation of the material handling vehicle 101, the automation arbitration controller 102 may operate in the request control mode 304, where the automation arbitration controller 102 enables one of the automation controllers to apply its vehicle operational control limits to the material handling vehicle. The vehicle operational control limits may include the predetermined control limits stored in the material handling vehicle controller 108. In the request control mode 304, only one automation controller may be allowed to control the material handling vehicle 101 at any point in time.

When operating in the request control mode 304, the automation arbitration controller 102 may grant control 306 of the material handling vehicle 101 to a desired one of the automation controllers based on a given request. If no automation controller is actively in control, and the material handling vehicle's internal checks allow autonomous mode to be activated, the material handling vehicle controller 108 may control vehicle operation until an automation controller requests control and is granted control 306 by the automation arbitration controller 102. Once the granted automation controller completes its control functions, for example, the navigation sensing system 126 can provide a path to the AGV controller 114 to navigate the material handling vehicle 101 to a load handling location, the automation arbitration controller 102 may release control from the granted automation controller and the next automation controller supplies a request. To further the example, the next automation controller may be an operational controller 116 that is a load handling-focused controller used to identify and engage loads. This process of granting, executing, and releasing processes may repeat until there are no more high-level requests, for example, from the warehouse management system. Additionally, the automation controllers may share information with one another through the automation arbitration controller 102. For example, the navigation sensing system 126 may hand off some data to the load handling controller to indicate what type of load handling should take place at a specific location, such as pick up, drop off, stack, lane build, etc.

In some instances, with a plurality of automation controllers attempting to control or limit operation of the material handling vehicle 101, the automation arbitration controller may operate in the request limit mode 308, where the automation arbitration controller 102 arbitrates and prioritizes 310 each of the requested control limits from the automation controllers essentially simultaneously to provide efficient and effective autonomous operation of the material handling vehicle. When operating in the request limit mode 308, the automation arbitration controller 102 may analyze each request 310 from the automation controllers and apply the most conservative control limits 312 to the material handling vehicle 101. For example, the material handling vehicle controller 108 can include its own list of vehicle events and associated limitations and operator configurable limitations, such as a maximum travel speed with the forks oriented in a specified direction. The automation arbitration controller 102 can determine the most restrictive or conservative limitations 312 based on the active automation controllers and pass that limitation 314 to the material handling vehicle controller 108.

In some embodiments, while in autonomous mode, the AGV controller 114 may not be allowed to supersede the predetermined control limits stored in the material handling vehicle controller 108. There may be applications where the material handling vehicle 101 imposes configured limits when an automation controller is not imposing limits, such as when no limits or control is applied by an automation controller. In some applications, when an automation controller requests vehicle operational control limits, the material handling vehicle 101 configured limits may be ignored.

As described above, the automation arbitration controller 102 may handle the signal from the deadman indicator 118 in different ways depending on the mode of operation. For example, in manual mode, the signal from the deadman indicator 118 may be passed to the material handling vehicle controller 108. When one of the automation controllers is attempting to limit the operation of the material handling vehicle (e.g., in manual mode), the deadman indicator 118 may be passed through to the material handling vehicle controller 108. When autonomous mode is being granted, the signal from the deadman indicator 118 may be set to "TRUE" only when autonomous mode is granted and no operator is sensed by the deadman indicator 118.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:

1. An automation arbitration controller system for a material handling vehicle comprising:
   a plurality of automation controllers;
   an automation arbitration controller;
   a material handling vehicle controller;
   an automation communication bus that connects the automation arbitration controller to the plurality of automation controllers, wherein the plurality of automation controllers are configured to send a plurality of automation requests to the automation arbitration controller via the automation communication bus, and wherein the automation arbitration controller is configured to arbitrate the plurality of automation requests by granting only one automation controller of the plurality of automation controllers control of the automation communication bus; and
   a vehicle communication bus that connects the automation arbitration controller to the material handling vehicle controller, wherein the material handling vehicle controller is configured to receive one of the plurality of automation requests from the automation arbitration controller via the vehicle communication bus such that the one automation controller controls the material handling vehicle.

2. The automation arbitration controller system of claim 1, wherein the at least one automation controller is an object detection controller configured to determine if one or more wheels of the material handling vehicle match an expected speed.

3. The automation arbitration controller system of claim 1, wherein the at least one automation controller is a zoning and positioning controller configured to communicate with a position sensing system that is configured to determine a position of the material handling vehicle within an environment.

4. The automation arbitration controller system of claim 1, wherein the at least one automation controller is an automatic guided vehicle controller configured to communicate with a navigation sensing system that is configured to choose a navigation path for the material handling vehicle.

5. The automation arbitration controller system of claim 1, wherein the at least one automation controller is an operational controller configured to govern operation of the material handling vehicle during performance of a task.

6. The automation arbitration controller system of claim 1, wherein the one automation controller controls the material handling vehicle by governing a set of control limits for operation of the material handling vehicle.

7. The automation arbitration controller system of claim 1, wherein the plurality of automation requests are arbitrated by the automation arbitration controller on a first come first serve basis or on a round robin basis.

8. The automation arbitration controller system of claim 1, wherein the automation arbitration controller arbitrates the plurality of automation requests by selecting a most conservative request from the plurality of automation requests.

9. The automation arbitration controller system of claim 8, wherein the most conservative request is selected when at least one of the plurality of automation controllers is configured for a limiting mode.

10. The automation arbitration controller system of claim 1, wherein the one automation controller is granted control of the automation communication bus based on an operational mode of operation of the one automation controller.

11. The automation arbitration controller system of claim 10, wherein the operational mode is a control mode.

12. The automation arbitration controller system of claim 1, wherein the material handling vehicle is configured to operate in at least one of a manual mode, a semi-autonomous mode, and an autonomous mode.

13. The automation arbitration controller system of claim 12, wherein the material handling vehicle controller is configured to grant the at least one of the manual mode, the semi-autonomous mode, and the autonomous mode based on vehicle control information determined based on data received from the one automation controller.

14. A material handling vehicle including an automation arbitration controller system, the automation arbitration controller system comprising:
   an automation arbitration controller on the material handling vehicle;
   a plurality of automation controllers on the material handling vehicle;
   an automation communication bus that connects the automation arbitration controller to the plurality of automation controllers;
   wherein the automation arbitration controller is configured to arbitrate a plurality of automation requests received from the plurality of automation controllers on the automation communication bus to determine vehicle control information by granting only one automation controller of the plurality of automation controllers control of the automation communication bus;
   a material handling vehicle controller on the material handling vehicle; and
   a vehicle communication bus that connects the automation arbitration controller to the material handling vehicle controller, the automation arbitration controller configured to communicate the determined vehicle control information to the material handling vehicle controller on the vehicle communication bus such that the material handling vehicle controller uses the determined vehicle control information to control the material handling vehicle.

15. The material handling vehicle of claim 14, wherein the plurality of automation requests request control of vehicle limits that govern operation of the material handling vehicle, and the automation arbitration controller is configured to arbitrate the plurality of automation requests based on a most restrictive request for control of the vehicle control limits.

16. The material handling vehicle of claim 14, wherein the automation arbitration controller is configured to arbitrate the plurality of automation requests from the plurality of automation controllers as received concurrently on the automation communication bus.

17. The material handling vehicle of claim 14, wherein the automation arbitration controller is configured to arbitrate the plurality of automation requests on at least one of a first come first serve basis or a round robin basis.

18. The material handling vehicle of claim 14, wherein at least one of the plurality of automation controllers is configured to operate in an operational mode that is set during initialization, and the automation arbitration controller is configured to enable or disable messages to and from the at least one of the plurality of automation controllers based on the operational mode.

19. The material handling vehicle of claim 18, wherein the operational mode comprises a limiting mode only, or a limiting mode and control mode.

20. The material handling vehicle of claim 14, wherein the automation arbitration controller is configured to operate in a request control mode, where the automation arbitration controller is configured to enable the one automation controller to apply its vehicle operational control limits to the material handling vehicle; or
   the automation arbitration controller is configured to operate in a request limit mode, where the automation arbitration controller is configured to arbitrate and prioritize a plurality of requested control limits from the one automation controller to provide control of the material handling vehicle.

* * * * *

UNITED STATES PATENT AND TRADEMARK OFFICE
CERTIFICATE OF CORRECTION

PATENT NO. : 11,740,631 B2  
APPLICATION NO. : 16/837585  
DATED : August 29, 2023  
INVENTOR(S) : Robert J. Paterson, Jr. et al.

Page 1 of 1

It is certified that error appears in the above-identified patent and that said Letters Patent is hereby corrected as shown below:

In the Claims

Claim 2, Column 10, Line 51, "the at least one automation controller is an" should be --the plurality of automation controllers comprises an--.

Claim 3, Column 10, Line 56, "the at least one automation controller is a" should be --the plurality of automation controllers comprises a--.

Claim 4, Column 10, Line 62, "the at least one automation controller is an" should be --the plurality of automation controllers comprises an--.

Claim 5, Column 10, Line 67, "the at least one automation controller is an" should be --the plurality of automation controllers comprises an--.

Signed and Sealed this  
Twenty-first Day of May, 2024

Katherine Kelly Vidal  
*Director of the United States Patent and Trademark Office*